No. 883,424. PATENTED MAR. 31, 1908.
B. F. ROGERS & E. L. RUCKER.
ATTACHMENT FOR HARVESTERS AND SEPARATORS.
APPLICATION FILED DEC. 9, 1907.
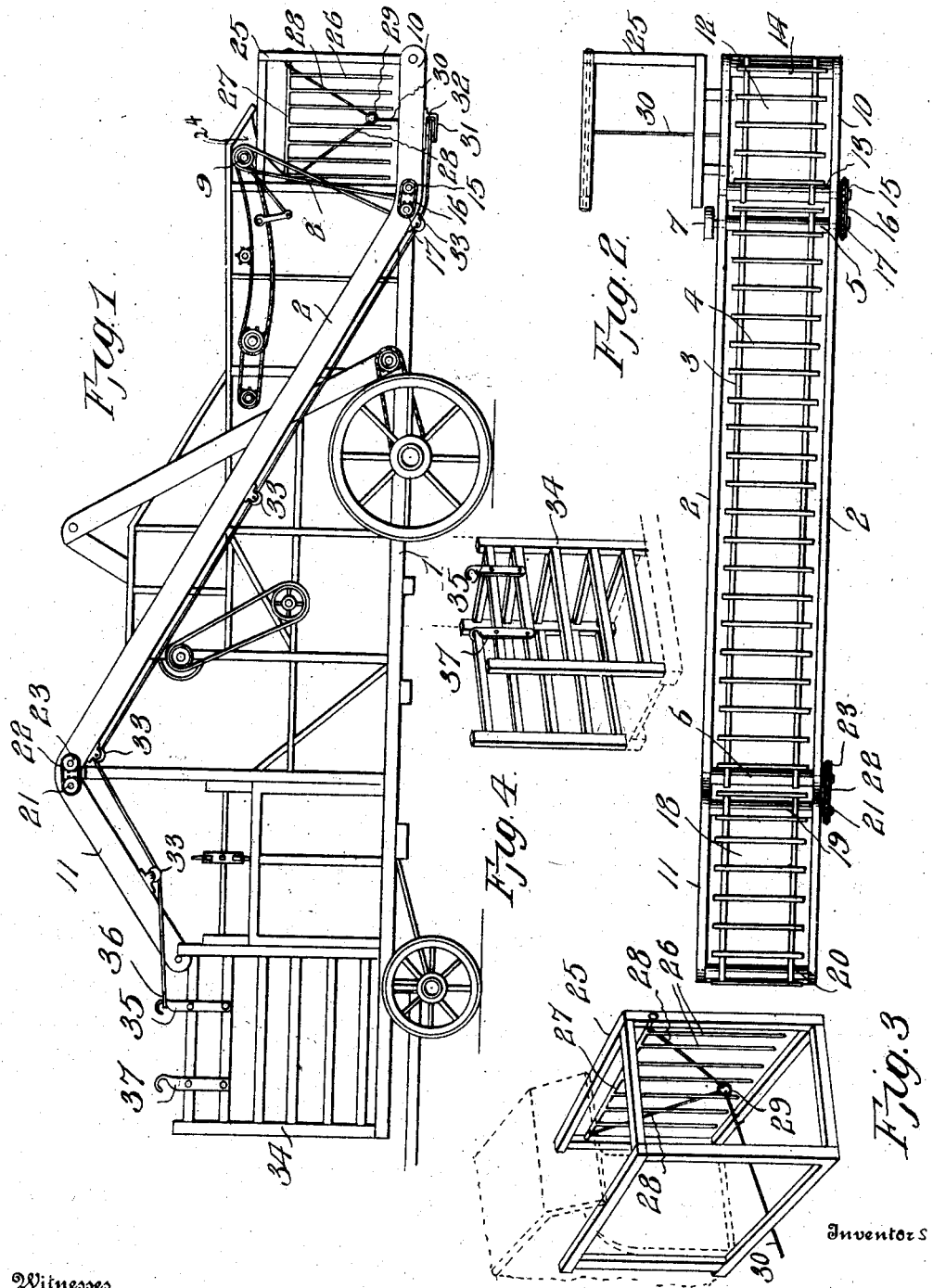
Witnesses
Frank Hough
M. J. Haas.
Inventors
Benjamin F. Rogers,
By Edward L. Rucker.
Attorney.

UNITED STATES PATENT OFFICE.

BENJAMIN F. ROGERS AND EDWARD L. RUCKER, OF LEWISTON, IDAHO.

ATTACHMENT FOR HARVESTERS AND SEPARATORS.

No. 883,424.    Specification of Letters Patent.    Patented March 31, 1908.

Application filed December 9, 1907. Serial No. 405,756.

*To all whom it may concern:*

Be it known that we, BENJAMIN F. ROGERS and EDWARD L. RUCKER, citizens of the United States, residing at Lewiston, in the county of Nez Perce and State of Idaho, have invented certain new and useful Improvements in Attachments for Harvesters and Separators, of which the following is a specification.

This invention relates to attachments for combined steam harvesters and separators, and the principle object of the same is to provide simple and efficient means for carrying the straw from the discharge end of the machine back to the engine, to be used as fuel.

In the grain raising portions of the Pacific States, fuel is comparatively scarce, while the straw from which the grain has been threshed is of no practical value.

Our invention contemplates means for automatically taking the straw as it is discharged from the harvester and carrying it to the engine to be used as fuel, thus saving considerable in the cost of fuel, and in handling the same, and at the same time utilizing a by-product of little or no value.

Another feature of our invention consists in providing means for delivering the straw to the engine in the quantity desired by the fireman. If the machine produces more straw than can be consumed by the engine, the surplus may be dropped at the discharge end of the harvester, while the endless conveyer runs without carrying the straw, until more fuel is needed for the engine, when the straw may again be deposited upon the conveyer and carried to the engine.

The objects and advantages referred to may be attained by means of the construction illustrated in the accompanying drawing in which,—

Figure 1 is a side elevation of a harvester and separator of usual construction, and showing our attachment in place thereon; Fig. 2 is a plan view of the conveyer removed from the machine; Fig. 3 is a perspective view of the straw slide and its supporting frame; Fig. 4 is a perspective view of the rack into which the straw is deposited ready for use as fuel.

Referring to the drawing for a more specific description of our invention, the numeral 1, designates the combined harvester and seperator, which may be of the usual or any suitable construction. Supported upon the frame of the harvester in any suitable manner is an endless conveyer, consisting of side bars, 2, and an endless apron comprising belts, 3, and cross slats, 4. The belts 3 pass around rollers 5 and 6, the roller 5 having a belt pulley 7 on one end thereof, around which a crossed belt 8 passes, said belt being passed around a pulley 9 on one of the shafts of the harvester. The side bars 2 of the conveyer frame have a horizontally disposed portion 10 at one end, and an inclined portion 11 at the opposite end. In the horizontal portion 10 a separate conveyer 12 is provided said conveyer being formed of belts and cross slats, like the main apron, and said conveyer 12 being passed around rollers 13 and 14. On the projecting end of shaft of roller, 13 is a sprocket wheel, 15, and a drive chain 16 passes around the sprocket 15 and around a sprocket 17 on one end of the shaft of roller 5. The inclined portion 11 of the conveyer is also provided with an endless apron 18 comprising belts and cross slats, said belts passing around rollers 19, 20, journaled in the side bars of the conveyer. The shaft of the roller 19 is provided on its outer end with a sprocket wheel 21, and a sprocket chain 22 passes around said sprocket wheel 21 and around a similar wheel 23 on the shaft of the roller 6. Thus the separate aprons of the different portions of the conveyer are simultaneously operated. The conveyer may be provided with covers made in sections.

Supported at one side of the portion 10 of the conveyer and in line with the straw discharge 24 of the harvester is a straw slide consisting of a rectangular skeleton frame 25 and a slide comprising slats 26 connected to rod 27 pivoted in the frame 25. Cords or ropes 28 are connected at their upper ends to the rod 27, and their lower ends are united by a ring 29, on the outer side of the slide. An operating rope or cord 30 is connected to the ring 29 and said rope passes around a pulley 31, mounted in a bracket 32, and under pulleys 33 under the conveyer.

A rectangular rack 34, in which the straw is discharged from the conveyer, at the end of the machine near the engine is provided with a hook 35, and the rope 30 has a ring 36 on its end which may be engaged with the hook 35. When the ring 36 is engaged with the hook 35, the straw slide hangs in a vertical position, and the straw then falls to the ground and is not carried to the opposite end of the machine. When the fireman requires more straw for fuel, the ring 36 is engaged with another hook 37, on the rack 34. When the rope is engaged with the hook 37, the straw slide is raised to an inclined position and the straw slides off on to the horizontal apron 12, from which it is conveyed to the main apron and from thence to the apron 18 and deposited in the rack 34, near the engine. Thus the fireman has full control of the feed of straw to the engine, and can regulate the quantity to suit varying conditions.

From the foregoing it will be obvious that by means of our invention the straw required for fuel is fed in the required quantity to the engine, that the conveyer is of simple construction, can be attached to any harvester and separator, and is composed of few parts which are not liable to get out of order.

Certain changes in the details of construction may be resorted to without departing from the spirit and scope of the invention as defined in the following claims.

Having thus described our invention, what we desire to secure by Letters Patent and claim is:—

1. An attachment of the character described, comprising an endless conveyer, a straw slide at one end of said conveyer, and means whereby said straw slide may be thrown into and out of operation.

2. In a device of the character described, an endless conveyer, a straw slide secured at one side of one end of the conveyer, said straw slide comprising a frame, a pivoted gate, a rope connected to said gate and extending to the opposite end of the machine, and means for holding said rope in positions to render the slide operative or inoperative.

3. In an attachment of the character described, an endless conveyer, a straw slide embodying a pivoted gate, a straw rack at the opposite end of the conveyer, hooks on the rack, and a rope connected to the gate and engaged with one of said hooks.

4. In an attachment of the character described, an endless conveyer, a straw slide at one end and side thereof, a straw rack at the opposite end of said conveyer, and means extending from the straw slide to the rack for throwing said slide into and out of operation.

In testimony whereof we affix our signatures, in presence of two witnesses.

BENJAMIN F. ROGERS.
EDWARD L. RUCKER.

Witnesses:
WILLIAM J. EDGAR,
WILLIAM LEACHMAN.